United States Patent
Queveau et al.

(10) Patent No.: US 7,377,575 B2
(45) Date of Patent: May 27, 2008

(54) VEHICLE WITH RETRACTABLE OPEN TOP AND METHOD FOR STOWING SAME, WITH HORIZONTAL TILTING SYSTEM

(75) Inventors: Gerard Queveau, Le Pin (FR); Paul Queveau, Montravers (FR); Jean-Marc Guillez, Cirieres (FR)

(73) Assignee: Société Européenne de Brevet Automobiles, Paris (FR)

( * ) Notice: Subject to any disclaimer, the term of this patent is extended or adjusted under 35 U.S.C. 154(b) by 27 days.

(21) Appl. No.: 10/564,772

(22) PCT Filed: Jul. 16, 2004

(86) PCT No.: PCT/FR2004/001883

§ 371 (c)(1),
(2), (4) Date: Jun. 28, 2006

(87) PCT Pub. No.: WO2005/007435

PCT Pub. Date: Jan. 27, 2005

(65) Prior Publication Data

US 2006/0249979 A1    Nov. 9, 2006

(30) Foreign Application Priority Data

Jul. 16, 2003    (FR) .................................. 03 08694
Jul. 21, 2003    (FR) .................................. 03 08895

(51) Int. Cl.
*B60J 7/00*    (2006.01)
(52) U.S. Cl. ................................. 296/107.18
(58) Field of Classification Search ........... 296/107.18, 296/220.01, 107.19
See application file for complete search history.

(56) References Cited

U.S. PATENT DOCUMENTS

| 6,312,042 | B1* | 11/2001 | Halbweiss et al. ..... 296/107.18 |
| 6,669,201 | B1* | 12/2003 | Guillez et al. ......... 296/220.01 |
| 6,767,046 | B1* | 7/2004 | Guillez et al. ......... 296/107.19 |
| 7,000,973 | B2* | 2/2006 | Guillez et al. ......... 296/107.08 |
| 7,309,099 | B2* | 12/2007 | Netzel et al. .......... 296/107.17 |
| 2005/0140164 | A1* | 6/2005 | Wilms et al. .......... 296/107.18 |
| 2007/0210610 | A1* | 9/2007 | Bunsmann et al. .... 296/107.18 |

FOREIGN PATENT DOCUMENTS

| DE | 10043712 | 4/2002 |
| DE | 20204110 | 9/2002 |
| FR | 2783760 | 3/2000 |
| FR | 2797813 | 3/2001 |
| FR | 2798327 | 3/2001 |

* cited by examiner

*Primary Examiner*—Kiran B. Patel
(74) *Attorney, Agent, or Firm*—Winston & Strawn LLP; Richard P. Gilly

(57) ABSTRACT

The invention concerns a method for stowing an open top (1, 3, 5, 9) in a vehicle storage space (53). The top being initially closed, it consists in displacing the roof parts up to the inside of the storage space, some at least up to a first substantially vertically stowed position, then in displacing again said roof part(s) towards a substantially horizontal position located either in the upper part or in the lower part of the storage space (53), to clear horizontally an additional storage depth.

7 Claims, 4 Drawing Sheets

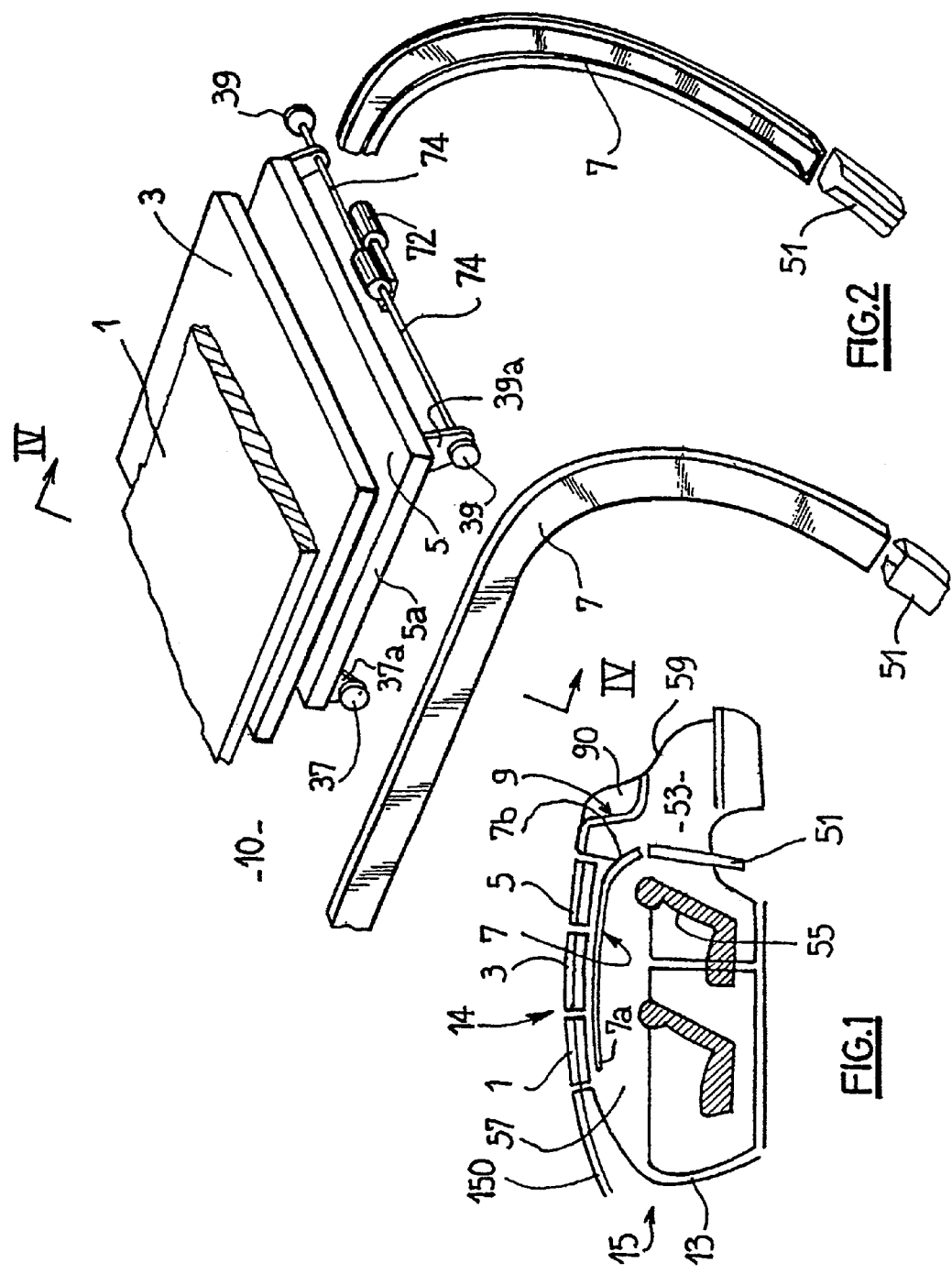

Figure 3:
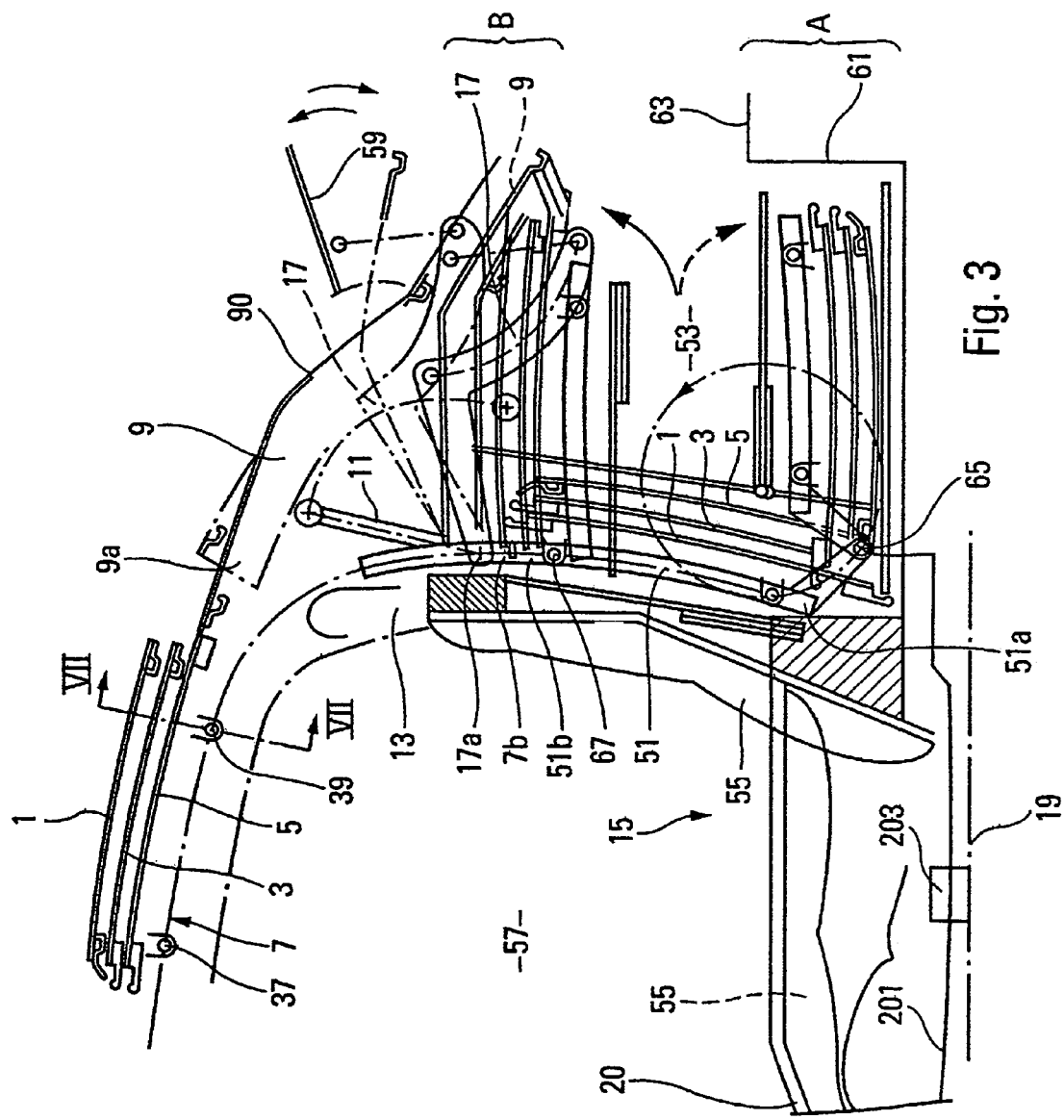

VEHICLE WITH RETRACTABLE OPEN TOP AND METHOD FOR STOWING SAME, WITH HORIZONTAL TILTING SYSTEM

This invention relates to a retractable roof system for a fixed or mobile structure and particularly for an automobile vehicle.

FR 2 798 327 describes a retractable roof system for a vehicle composed of at least two rigid roof panels, namely a first front roof panel and a second central roof panel fixed to each other by sliding means arranged such that the front panel is free to move between a closed position in which it covers the passenger compartment and an open position in which it is superposed on the central panel, after sliding backwards. The above-mentioned roof system comprises two parallel arc-shaped slides fixed to the vehicle bodywork and each extending between a point close to the front of the central panel and a point close to the back of the vehicle trunk and the rear part of the vehicle, the central panel comprising devices cooperating with the slides to guide its displacement along the slides.

Like other known solutions for storing opening roofs, one disadvantage of this solution relates to the volume occupied by the folded roof in the space reserved for storage (baggage, etc.) at the back of the passenger compartment, typically in the trunk (regardless of whether or not the trunk projects outwards).

The purpose of this invention is to overcome the disadvantages of the above-mentioned system and to propose a compact solution adaptable to different vehicle types and that can be made in large production series.

The proposed solution is related to a vehicle with an opening roof consisting of at least two mobile parts that can be stored in the final substantially horizontal position and a tilting rear window (particularly an oscillating-sliding window) that may or may not form part of the said mobile parts of the roof mentioned above, the said storage position leaving a large storage volume.

More precisely, according to this invention, the vehicle concerned has a front and a rear and comprises:
- a passenger compartment with seats near the rear of the passenger compartment,
- a vehicle structure locally defining a roof panel with a closeable opening and a retractable roof, this roof comprising at least two rigid parts free to move with respect to the said structure, namely a first front part and a second rear part respectively,
- first displacement means to which the said parts of the roof are connected at least during part of their movement between an extended position reached by forward displacement in which these parts are substantially flush one behind the other and cover the passenger compartment, and a folded position reached by a displacement towards the rear of the vehicle in which the said parts are offset from each other and are behind the seats, at least some of these roof parts then being arranged in a first storage position,
the vehicle being characterized in that it also comprises second displacement elements into which at least the said roof parts engage when they are arranged in their said first storage position, to displace these roof parts if necessary towards a second storage position different from the first position (and a priori substantially horizontal).

This type of roof system improves the storage space available at the rear in the trunk.

For compactness, effectiveness and reliability reasons, the second displacement means will preferably be installed free to move with respect to the vehicle structure and with respect to the first displacement means, the roof parts arranged in the first storage position becoming free from the first displacement means while engaging the second displacement means so that they can move from their first position to their second storage position.

Furthermore, it is recommended that:
- the first and the second displacement means comprise first and second slides respectively,
- the said rigid parts of the first roof part comprise several substantially flat panels free to move with respect to each other and arranged above the passenger compartment when the roof is in the closed position, in front of a rear element of the roof containing the rear window of the vehicle and belonging to the said second part of the roof,
- and to fold away, the said mobile roof panels pass firstly into the first storage position and then into the second storage position, engaging firstly the first slides and then the second slides which are mounted free to move on the structure with respect to the first slides so as to displace the roof panels between their said first and second storage positions.

This is a reliable and compact mechanism.

Preferably, each slide assembly and the second displacement elements connected to it also define a first front part of the slide extending between a point at the front of the said rear part of the roof and a point close to the upper edge of the back of the said seats, and a second slide part extending in an inclined position substantially between the said upper edge of the rear part of the said seats and a point located lower down, each second slide part being installed free to move with respect to the vehicle structure and to the first part of the corresponding slide and being connected to the said roof parts concerned, when they reach their first folded position and these parts are then engaged with the second slide parts and are disengaged from the first slide parts to bring these roof parts into their said second superposed storage position.

Once again, the space occupied in the vehicle must be compact and operation must be efficient and reliable.

Furthermore, such a retractable system enables precise guidance of roof parts between their closed position above the passenger compartment and their open position (stored in the rear).

According to another characteristic, the invention discloses that:
- the said roof parts comprise at least two so-called rigid panels, a first front panel and a central second panel respectively, the panels being connected together by connecting means arranged such that the front panel is free to move between its extended position reached by a forward displacement in which the said panel is above the passenger compartment in front of the central panel, and an open position reached by displacement towards the rear of the vehicle in which the front and central panels are superposed substantially horizontally, the central panel possibly being moved by cooperation with the first displacement means and at the same time as the front panel adjacent to it, between its extended position in which it is above the passenger compartment and its first storage position (folded) in which the front and central panels are retracted side by side in the storage space,
- in the extended position, the roof parts are inserted one behind the other between the windshield at the front that is fixed to the vehicle structure and a rear element (that may be retractable) containing the rear window, and in a second stored position (illustrated horizontally), the front and central panels are preferably arranged either in the upper part of the said roof storage area, or in the lower part in an area left free in the bottom of the storage space.

If a retractable rear window is to be used, the invention advantageously allows for the rear element of the roof to be displaceable between its extended position in which it covers the passenger compartment and its folded position in which it is tilted backwards directly substantially horizontally in the upper part of the storage space behind the seats and above the storage level of the other front panels.

Figure 4:
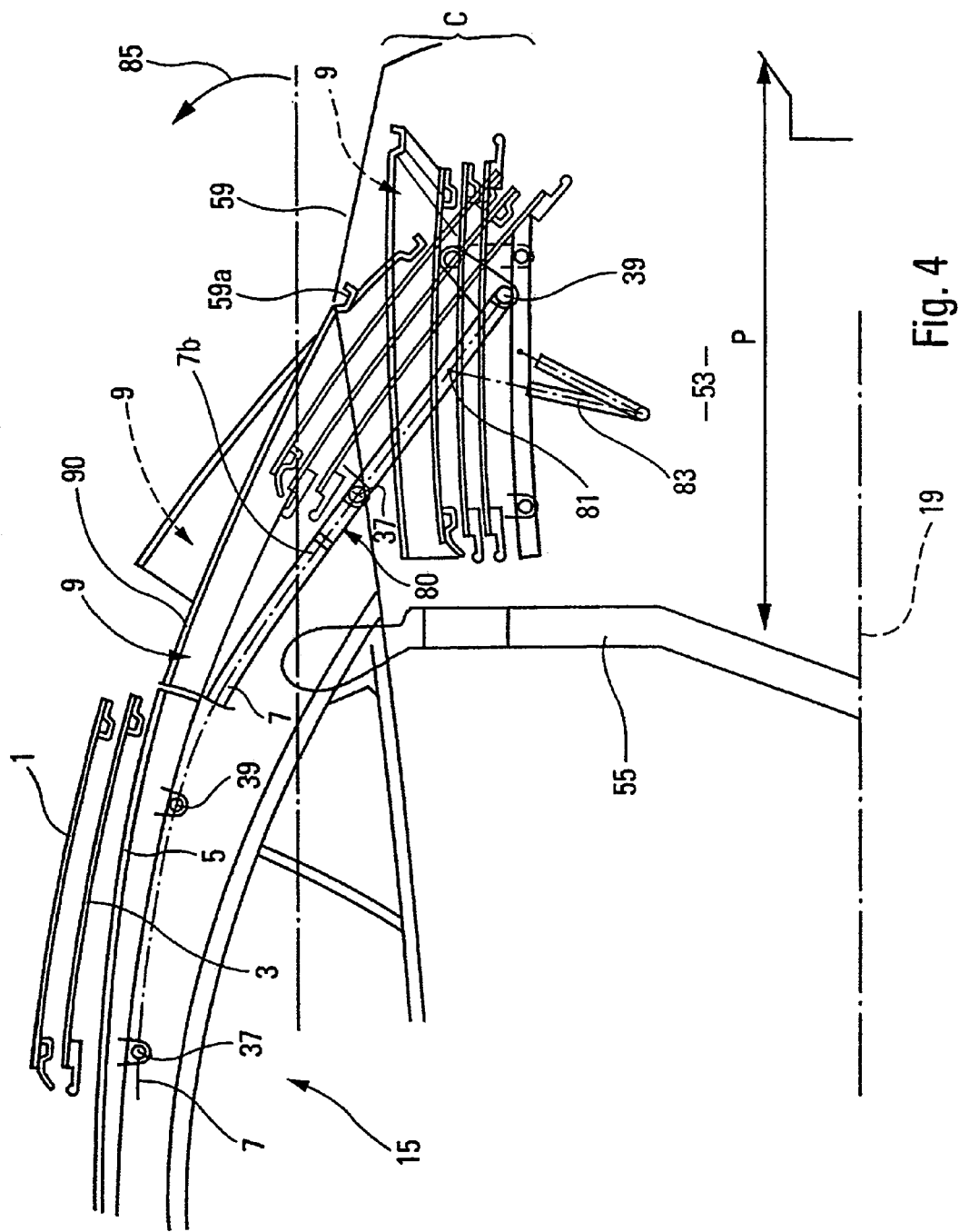
Figure 5:
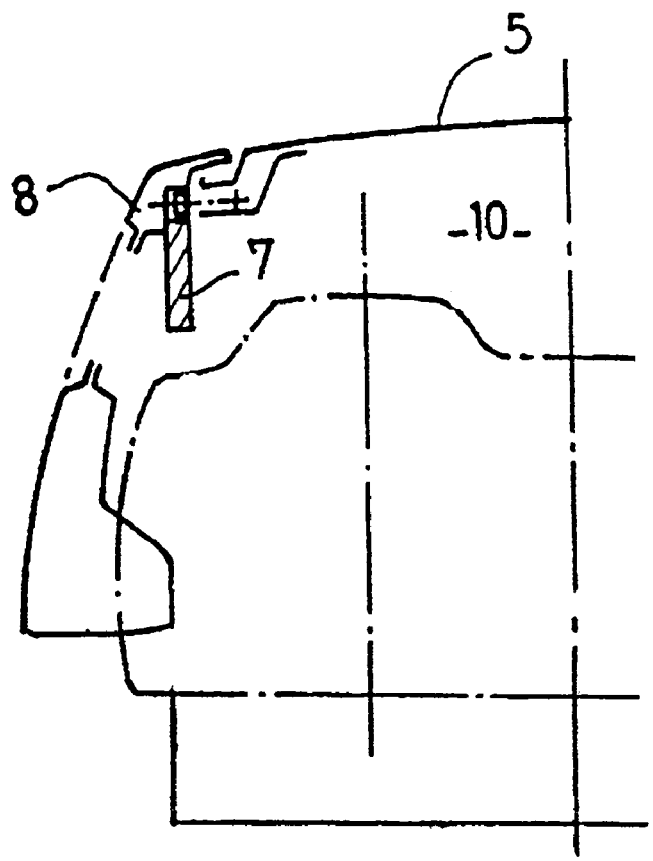
Figure 6:
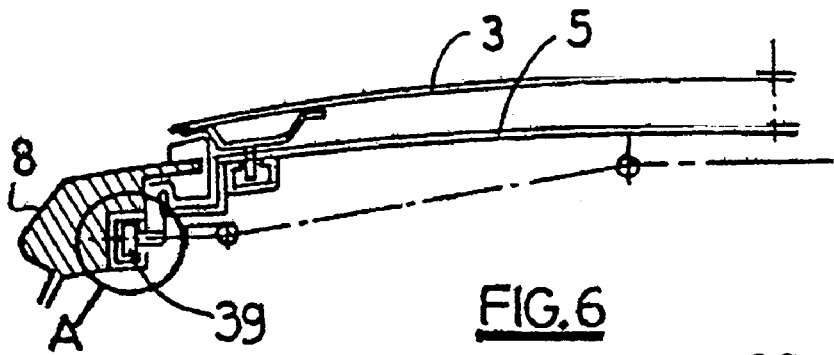
Figure 7:
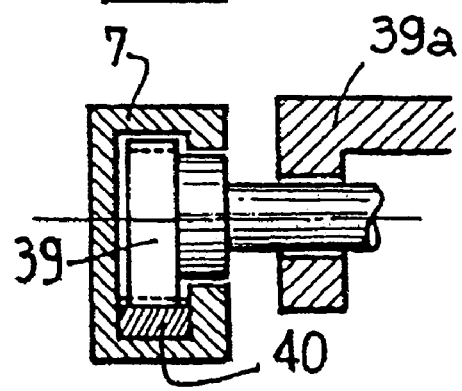

According to another aspect, the invention discloses the following arrangement so that the opening roof can be stored in its storage space behind the rear seats:

a) starting from a closed state of the roof in which the two parts of the roof cover the passenger compartment while being substantially flush one behind the other, these roof parts can be displaced into the inside of the storage space, at least some of these parts being brought to a first substantially vertical storage position, b) and then the roof part(s) concerned can be displaced again to a substantially horizontal position to open up a useful depth in the horizontal direction;

We will now describe particular embodiments of the invention as non-limitative examples with reference to the attached diagrammatic drawings in which:

FIG. 1 is a diagrammatic view of a vehicle fitted with a retractable roof that can be used in accordance with this invention, FIG. 2 is a side view of a part of a vehicle fitted with a sliding-tilting roof, FIGS. 3 and 4 show two possible embodiments of the opening roof systems according to the invention, FIG. 5 is a half cross-section of the rear part of the vehicle, FIG. 6 is a half-section along plane IV-IV in FIG. 2, FIG. 7 is an enlarged view of detail A in FIG. 6.

In the embodiment shown, the invention comprises three central roof elements (or parts) 1, 3, 5 installed free to slide on two parallel lateral slides 7 particularly extending on each side of an opening 10 formed in the roof panel 14. A rear roof element (or part) including the window 9 is also provided installed, free to oscillate-slide by an arm 11 connected to the chassis 13 (also called the vehicle structure 15) and a slide 17 installed free to pivot on the said structure 13 along a axis 17a transverse to the longitudinal direction 19 in which the vehicle moves forwards. The slide 17 thus tips with the cover of the trunk 59 when it rotates with respect to the vehicle structure only to open forwards.

In the description, "central roof elements" means roof elements installed on the slide 7 and "rear roof element" means the rear tilting part 9 that includes the rear window 90.

Thus, the central roof elements 1, 3, 5 are inserted between the windshield 150 fixed to the structure 13 and the rear element 9 (that may be fixed or mobile) when the roof is in the closed position above the passenger compartment.

The slides 7 are arc-shaped and extend between an area 7a located in front of the roof element 1, on each side of the opening 10 (in the example in FIG. 1), and an area 7b located in the space 53 in which the roof is stored in its folded position, behind the seats 55 near the top part of the seat backs, under the level 17a at which the additional slides 17 are articulated.

In another embodiment, the slides 7 may be interrupted near the front, facing the roof element 5 located just in front of the rearmost element 9, particularly assuming a roof opening in two parts only (5 and 9).

In order to fold into the storage space 53, the central panel 5 can be displaced by moving the panels 1 and 3 that are then superposed on it, between a closed position in which it covers the passenger compartment and a folded position in which the three panels 1, 3 and 5 are housed, in their side by side position in a first storage position inclined from the horizontal behind the passenger compartment 57.

The system for guidance of the displacement of panels 1, 3 towards their position superposed with panel 5 at the top of the roof will not be described in detail here.

This system was described in French patent FR-B-2694245 and in the French patent application FR-A-2 797 226.

The central panel 5 comprises devices that will be described in detail later and that cooperate with the two slides 7 to guide its displacement along them.

As can be seen particularly in FIG. 2, the arc-shaped slides 7 are concave facing the inside of the passenger compartment. This arc shape guides displacement of panels 1, 3, 5 through a passage between the rear seats 55 and the rear part 9 of the roof.

The devices of the panel 5 cooperating with the slides comprise two rollers 37, 39 fixed to lugs 37a, 39a located close to each of the side edges 5a of the panel 5, close to the front and close to the back of the panel as shown in FIG. 2.

The retractable roof system according to the invention also comprises means of driving displacement of the panel 5 along the slides.

These means may include cables driven by a motor or an actuator. Preferably, the rollers 37, 39 are shaped like gears (see FIGS. 6, 7 and are engaged into a rack 70 fixed to each slide 7 (or 51 as will be understood later) and along the profile of the slide.

As can be seen in FIGS. 2 and 6, the pair of rollers 39 located near the back of the panel 5 is driven in rotation by an electric motor 72 connected to each roller through a half transmission shaft 74.

FIG. 5 also shows that each slide 7 is fixed at its upper part to one of the two side parts 8 of the fixed roof located on each side of the roof opening 10.

Once the central roof elements 1, 3 and 5 are superposed substantially horizontally above each other (FIGS. 3 and 4), the rear roof element 9 is driven backwards by the arm 11 so as to offset the front edge 9a of the rear roof element 9 upwards, thus enabling the passage of the central roof elements.

These central roof elements are retracted as follows. Firstly, an appropriate mechanism controls sliding of the front panel 1 backwards, until this panel is superposed on the panel 3 since these two panels are then superposed on the panel 5 as shown in FIGS. 1 and 2.

The electric motor 72 start control is applied starting from this position in which the panels 1, 3, 5 are locked together. This motor rotates the half-shafts 74 and the gear shaped rollers 39. Rotation of these rollers 39 with the racks 40 of the slides 7 displaces the panels towards the space 53 behind the seats 55 until the rollers reach their limit stop.

Depending on the curvature of the slides, in this first storage position the two panels 1, 3, 5 preferably occupy an almost vertical position (FIG. 3) or inclined from the horizontal (FIG. 4).

Obviously, if the electric motor is controlled to move in the reverse direction, the panels 1, 3, 5 will be moved out from the trunk into the roof closed position.

There is a mobile slide 51 colinear with and extending each slide 7 in which the panels 1, 3, 5 will engage while they disengage from the slide 7, to access their second storage position.

Thus, we will be able to selectively retract these panels in a storage position that a priori minimizes the inconvenience that it causes, either just under the rear element 9 near the top of the space 53 (FIGS. 3 and 4) or at the bottom of the trunk (FIG. 3). This substantially horizontal position has been found to be the most appropriate final storage position, since it thus releases the space 53 towards the front as far as the seats 55, or even further if they are folded forwards.

To reach their second storage position, in the embodiment shown in FIG. 3 the central roof elements are driven beyond the slide 7 along the pivoting slide 51 into a substantially vertical position in the trunk or storage space 53 behind the rearmost seats 55 of the vehicle in the passenger compartment 57. The mobile slide 51 runs along the back of seats 55 in this first vertical storage position of the roof elements 1, 3, 5. Once these central roof elements have been stored vertically, the rearmost roof element 9 will tip backwards from its high position above the back of the passenger compartment to its position stored in the space 53, driven by the drive arm 11 and guided by the slide 17 to move into position directly and a priori finally in a substantially horizontal position (mark 9 in dashed lines in FIG. 1).

The central roof elements 1, 3, 5 are then still in their substantially vertical position on the second slide 51 installed free to pivot on the structure 13. This second slide will pivot the central roof elements from their first substantially vertical storage position to a substantially horizontal storage position that may be located in a bottom opening 61 of the floor 63 of the trunk, facing the storage space 53 (position called the low substantially horizontal position corresponding to mark A in FIG. 1). In this case the second slide 51 is articulated to the structure 13 through a rotation axis 65 transverse to the vehicle longitudinal axis 19 located on the lower end 51*a* of the second pivoting slide.

In this version, it is also possible to pivot the roof elements 1, 3, 5 stored in their substantially vertical position, to a substantially horizontal storage position under the rear window 9 in a substantially horizontal position (then called the high substantially horizontal position corresponding to mark B in FIG. 1). The slide 51 is then articulated to the chassis 13 by a rotation pin 67 transverse to the longitudinal axis 19 located on the upper end 51*b* of this slide.

A lock system not shown could be used to make the roof elements pivot between their said substantially vertical and horizontal storage positions, high and low, by providing two pivot pins 65, 67 on the slide 51, and by selectively acting on one of the locks.

Selective means such as a switch 200 connected to a cable 201 and to a motor 203 itself connected to the part of the slide 51 concerned, are used to control the movement of the parts of the roof concerned at will between their first and second storage positions (in this case vertical and horizontal respectively).

It is also possible to tilt the back of the rear seats 55 forwards into a substantially horizontal position (see mark 55 in dashed lines in FIG. 1) so that the trunk volume can be even further increased. It will even be possible to envisage the solution of using a second slide such as 51 fixed to the seat back pivoting forwards and thus positioning the roof elements stored in a substantially horizontal position above the seat back.

In the version in FIG. 4, the second mobile slide set used to transfer the roof panels 1, 3, 5 from their first storage position to their second storage position has been marked 80.

This set of slides 80 (one slide colinear with and extending each first slide 7) is articulated at substantially mid-length about a hinge pin 81 perpendicular to the longitudinal axis 19 of the vehicle.

Each slide 80 is maneuvered by a motor driven system comprising an actuator 83.

In FIG. 4, the curvature of the slide 7 is lower and its rear end is interrupted at 7*b* at the back of the passenger compartment but just above the back of the rear seats 55. The slides 80 extend along the same axis above the storage space 53, in other words the top part of the trunk in which the cover is once again marked 59, and is articulated only at the front at 59*a*, to open only towards the front of the vehicle along the direction of the arrow 85.

Each slide 80 is straight and extends behind the back of seats 55 over a substantial part (the majority) of the depth P of the trunk, which in this case is coincident with the storage space 53.

The hinge pin 81 of the second slides 80 is located substantially at the top of the seats 55 or slightly below.

It will be noted that in the solution in FIG. 4, the roof panels 1, 3, 5 are not strictly vertical in their first storage position (solid line in the Figure) but are inclined from the horizontal, near the bottom of the rear element 9, such that they close off at least part of the rear vision through the rear window 90.

These panels 1, 3, 5 may be made to move (in fact tilt) from their first superposed storage position into their final storage position in which they are still superposed in the same manner except in a substantially horizontal position, as shown in dashed lines facing zone C in FIG. 4, to provide good rear vision and improve the aesthetics but without occupying an excessive amount of space in the storage module 53.

Once this position has been reached following actuation of the actuator 83 and when the rollers 37, 39 have become free from the slides 7 followed by engagement into the slides 80, the rearmost roof element 9 finishes the backward tilting movement that it had started to leave room for roof panels, the element 9 still being moved by its side arms 11 and guidance of the slides 17 still being placed in the same position as shown in FIG. 3, in this case just above panels 1, 3, 5 in an oscillating-sliding movement.

Since the motor-driven control of the rear element 9 may be conventional, it will not be described or shown herein.

In the above, it will have been noted that the rear panel 5 of the roof panels 1, 3, 5 entrains the movement of panels between the positions shown in FIGS. 3 and 4.

However, it will be noted that the front panel 1 is the driving panel, for example being connected to a motor-drive system that would move the panels between their extreme closed and open positions, making use of drive cables to move the panels.

The invention claimed is:

1. A vehicle having a front, a rear and longitudinal axis, and comprising:
   a vehicle structure having a top opening and including a passenger compartment provided with seats near the rear of the passenger compartment, and a storage area located behind said seats, a retractable roof adapted for closing said upper opening, the roof comprising at least two rigid parts free to move with respect to said structure, said at least two rigid parts comprising a first front part and a second rear part, first displacement means to which said first and second parts of the roof are connected at least during part of a movement thereof between an extended position, reached by forward displacement, in which said first and second parts are substantially in line one behind the other and cover the passenger compartment, and a folded position reached by a displacement towards the rear of the vehicle in which the first and second parts are offset from each other and are retracted behind the seats, at least one of said at least two rigid parts then being arranged in a first storage position, second displacement elements with which is engaged at least said rigid roof part arranged in the first storage position, for a possible displacement thereof towards a second storage position different from the first position, wherein the second roof part comprises a rear roof element including a rear window which extends transverse the longitudinal axis of the vehicle, said rear roof element being free to move with respect to the vehicle structure, and the first front part of the roof being arranged in front of said rear roof element when the roof is closed.

2. The vehicle of claim 1, wherein the second displacement means are installed free to move with respect to the vehicle structure and with respect to the first displacement means, each of said roof part arranged in the first storage position becoming free from the first displacement means while engaging the second displacement means, to be moved from said first position to said second storage position.

3. The vehicle of claim 1, wherein:

the first and the second displacement means comprise first and second slides, respectively, the second slides are installed free to move on the structure with respect to the first slides, and to be stored, the first roof part is successively moved to the first storage position and then to the second storage position, by engaging in sequence the first slides and then the second slides.

4. The vehicle of claim 1, wherein:

the vehicle structure comprises additional slides, and throughout its movement, the rear roof element engages the first displacement elements and said additional slides, to move it out of the storage area and to retract into it.

5. The vehicle of claim 1, wherein the rear roof element is retracted into the storage area, directly and exclusively in a horizontal storage position.

6. The vehicle of claim 1, wherein:

the first roof part comprises at least one substantially flat front roof panel which becomes free from the second displacement means in the extended position and is connected thereto during displacement between the first and second storage positions, the rear roof element is connected to the first displacement elements, while it moves between its extended and folded positions, and, during said movement, the rear roof element extends substantially horizontal, such that said at least one substantially flat front roof panel is free to move between:

its extended position, in which it covers the passenger compartment, in front of the roof rear element, and its folded position in which said front panel is firstly arranged in its first storage position, and is then tilted substantially horizontal in the second storage position, and the roof rear element is installed free to tilt with respect to the vehicle structure, to enable the passage of said at least one substantially flat front roof panel, when said panel moves between the extended position and the first storage position.

7. The vehicle according to claim 6, wherein the rear roof element is installed free to tilt with respect to each said at least one substantially flat front roof panel to enable the passage thereof under said rear roof element when said at least one substantially flat front roof panel moves from the extended position to the folded position.

* * * * *